(12) United States Patent
Loos

(10) Patent No.: US 11,349,367 B2
(45) Date of Patent: May 31, 2022

(54) SUPPORT DEVICE FOR A ROTOR OF A SEPARATELY EXCITED INTERNAL-ROTOR SYNCHRONOUS MACHINE CONSISTING OF A SUPPORT RING AND A STAR DISK

(71) Applicant: Bayerische Motoren Werke Aktiengesellschaft, Munich (DE)

(72) Inventor: Daniel Loos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/964,061

(22) PCT Filed: Oct. 15, 2019

(86) PCT No.: PCT/EP2019/077841
§ 371 (c)(1),
(2) Date: Jul. 22, 2020

(87) PCT Pub. No.: WO2020/099048
PCT Pub. Date: May 22, 2020

(65) Prior Publication Data
US 2021/0050761 A1 Feb. 18, 2021

(30) Foreign Application Priority Data
Nov. 14, 2018 (DE) ...................... 10 2018 128 521.3

(51) Int. Cl.
*H02K 1/24* (2006.01)
*H02K 3/52* (2006.01)
*B60K 6/26* (2007.10)

(52) U.S. Cl.
CPC ............... *H02K 3/527* (2013.01); *B60K 6/26* (2013.01); *H02K 1/24* (2013.01); *B60Y 2200/91* (2013.01);
(Continued)

(58) Field of Classification Search
CPC ............ H02K 1/24; H02K 3/38; H02K 3/527; H02K 7/006; H02K 2203/12
See application file for complete search history.

(56) References Cited
U.S. PATENT DOCUMENTS 3,831,268 A * 8/1974 Boyd ................... H02K 15/024
29/598
4,105,906 A * 8/1978 Ade ....................... H02K 3/487
310/214
(Continued)

FOREIGN PATENT DOCUMENTS
DE   15 38 750 A1   11/1969
DE   29 14 316 A1   10/1980
(Continued)

OTHER PUBLICATIONS
International Search Report (PCT/ISA/210) issued in PCT Application No. PCT/EP2019/077841 dated Feb. 10, 2020 with English translation (four (4) pages).
(Continued)

*Primary Examiner* — Dang D Le
(74) *Attorney, Agent, or Firm* — Crowell & Moring LLP

(57) ABSTRACT

A support device for a rotor of an internal-rotor synchronous machine of a motor vehicle includes a star disk, which is able to be arranged on the laminated core of the rotor between an end side of the laminated core and end windings of the rotor windings, and a support ring for encasing the star disk. The star disk has a ring carrier for arranging on a rotor yoke of the laminated core, supporting teeth, protruding radially from the ring carrier, for arranging on rotor teeth of the laminated core, and collar-type end pieces, protruding axially from ends of the supporting teeth, for arranging on pole shoes of the rotor laminated core. The end pieces of the star disk and the support ring have mutually complementary
(Continued)

bayonet joint regions, which are designed to connect the star disk and the support ring in a form-fitting manner.

14 Claims, 5 Drawing Sheets

(52) U.S. Cl.
CPC ....... *B60Y 2200/92* (2013.01); *B60Y 2400/60* (2013.01)

(56) References Cited

U.S. PATENT DOCUMENTS

| | | | | |
|---|---|---|---|---|
| 6,133,668 | A * | 10/2000 | Huang | H02K 3/51 29/598 |
| 6,849,987 | B2 * | 2/2005 | Tornquist | H02K 3/527 310/260 |
| 7,265,466 | B2 * | 9/2007 | Yamashita | H02K 1/148 310/261.1 |
| 9,166,454 | B2 * | 10/2015 | Chun | H02K 3/487 |
| 10,033,255 | B2 * | 7/2018 | Park | H02P 29/00 |
| 2018/0109170 | A1 | 4/2018 | Park et al. | |

FOREIGN PATENT DOCUMENTS

| | | |
|---|---|---|
| DE | 39 03 945 C1 | 7/1990 |
| DE | 10 2015 201 218 A1 | 7/2016 |
| DE | 10 2016 215 716 A1 | 2/2018 |
| FR | 3 048 566 A1 | 9/2017 |

OTHER PUBLICATIONS

German-language Written Opinion (PCT/ISA/237) issued in PCT Application No. PCT/EP2019/077841 dated Feb. 10, 2020 (seven (7) pages).

German-language Office Action issued in German Application No. 10 2018 128 521.3 dated Oct. 15, 2019 (four (4) pages).

\* cited by examiner

SUPPORT DEVICE FOR A ROTOR OF A SEPARATELY EXCITED INTERNAL-ROTOR SYNCHRONOUS MACHINE CONSISTING OF A SUPPORT RING AND A STAR DISK

BACKGROUND AND SUMMARY OF THE INVENTION

The invention relates to a support device for a rotor of a separately excited internal-rotor synchronous machine of a motor vehicle which is able to be electrically driven, having a star disk which is able to be disposed on a laminated core of the rotor, between an end side of the laminated core and end windings of rotor windings of the rotor which project on the end side, and having a support ring for encasing the star disk. The invention moreover relates to a rotor, to a separately excited internal-rotor synchronous machine, and to a motor vehicle.

The interest presently is focused on separately excited, or current-excited, respectively, internal-rotor synchronous machines for motor vehicles which are able to be electrically driven, for example electric or hybrid vehicles. Such separately excited synchronous machines have a stationary stator having stator windings which are able to be energized, and a rotor which is mounted so as to be able to rotate in relation to the stator and which has rotor windings which are able to be energized. The rotor has a laminated core which supports the rotor windings. The rotor windings configure end windings at opposite end sides of the laminated core. In order to mechanically support the end windings of the rotor in relation to high centrifugal forces of a rotating rotor, star disks are known from the prior art. Star disks are disposed on the axially opposite end sides of the laminated core, between the end sides and the end windings, and serve for deflecting the rotor windings.

In order to prevent the star disks from being damaged on account of the mechanical stress by virtue of the centrifugal forces, a metallic support ring which radially surrounds, or encases, respectively, the star disk can be disposed on each star disk. In order to enable high rotating speeds of the rotor, this support ring has to be securely held on the star ring. For example, metallic tie rods can be used for fastening the support rings, this however results in an increased requirement in terms of installation space and an increased investment in materials. Moreover, an electromagnetic short circuit cage is created on account of the metallic contact between the tie rods and the support rings, the electromagnetic short circuit cage generating additional losses in the rotor. These losses have a disadvantageous effect on an efficiency and a thermal condition of the rotor. Even welding or screw-fitting the support ring to the star disk would have a negative effect on the output data of the machine. Bores and notches caused by the screw-fitting, and thermal inputs into the rotor caused by the welding, moreover reduce a strength of the rotor.

It is an object of the present invention to provide a particularly stable rotor, suitable for high rotating speeds, for an electric internal-rotor synchronous machine of a motor vehicle.

This object is achieved according to the invention by a support device, by a rotor, by an internal-rotor synchronous machine, as well as by a motor vehicle, having the features according to the respective independent patent claims. Advantageous embodiments of the invention are the subject matter of the dependent patent claims, of the description, as well as of the figures.

A support device according to the invention for a rotor of a separately excited internal-rotor synchronous machine of a motor vehicle which is able to be electrically driven has a star disk which is able to be disposed on a laminated core of the rotor, between an end side of the laminated core and end windings of rotor windings of the rotor which project on the end side, and has a support ring for encasing the star disk. The star disk comprises a ring carrier for disposal on a rotor yoke of the laminated core. Moreover, the star disk comprises supporting teeth which, for disposal on rotor teeth, project radially from the ring carrier, the rotor teeth for deflecting the rotor windings projecting radially from the rotor yoke and supporting the rotor windings. The star disk furthermore comprises collar-type end pieces which for disposal on pole shoes that project from the rotor teeth and for absorbing centrifugal forces of the end windings which are radially adjacent to the end pieces, project axially from ends of the supporting teeth. The end pieces and the support ring have mutually complementary bayonet closure regions which are able to be locked to one another by a plug-fitting/rotating movement and which are conceived for connecting in a form-fitting manner the star disk and the support ring.

The invention moreover relates to a rotor for a separately excited internal-rotor synchronous machine of a motor vehicle which is able to be electrically driven, having a laminated core having an annular rotor yoke, rotor teeth which project radially from the rotor yoke, and pole shoes which project on the rotor teeth. The rotor moreover has rotor windings which are wound about the rotor teeth and on axially opposite end sides of the laminated core configure end windings, as well as at least one support device according to the invention. The star disk is disposed between one of the end sides and the end windings. The support ring radially surrounds the star disk and is connected in a form-fitting manner to the star disk.

The rotor can be disposed in a cavity of a stator of a current-excited internal-rotor synchronous machine. The rotor comprises the laminated core, or a rotor core, respectively, which supports the rotor windings. The rotor core is usually constructed in layers and is composed of up to 200 metal plates which are stacked on top of one another. The rotor core has an annular rotor yoke and a plurality of rotor poles which in the circumferential direction are disposed along a rotor circumference on the rotor yoke. A rotor shaft is disposed within the rotor yoke and connected to the iron core. The rotor poles are usually composed of a rotor tooth, or a rotor shaft, respectively, which projects radially from the rotor yoke, as well as of a circular segment-shaped pole shoe which projects tangentially from the rotor tooth. Rotor grooves which, with the exception of a slot between two adjacent pole shoes, are closed by the pole shoes and in which the rotor windings are incorporated are formed between the rotor teeth. The rotor windings protrude from the rotor grooves on axially opposite end sides of the laminated core, run beyond the rotor teeth at the end sides and at the latter configure end windings.

The rotor for each end side can have one support device which has in each case one star disk and one support ring. The star disks are disposed so as to bear on the axially opposite end sides of the laminated core. The star disks serve inter alia for deflecting the wires of the windings of the rotor windings at the respective end side such that the wires of the windings wound about the rotor teeth run over the supporting teeth of the star disk on the end side. To this end, the star disk has a shape which corresponds to that of the end side. This means that the star disk and the end side are configured so as to be approximately congruent such that the star disk can be brought to bear in an exact fit on the end side. To this end, the star disk has the ring carrier which corresponds to the shape of the rotor yoke, a number of supporting teeth that corresponds to the number of rotor poles, as well as the collar-type end pieces which correspond to the pole shoes. The end piece herein is angled axially in terms of the supporting teeth or the supporting arms, respectively, and extends away axially from the end side of the laminated core. The end pieces in the axial direction thus increase in terms of length an external side of the laminated core which is formed by the pole shoes. Moreover, a width of the end pieces in the circumferential direction is larger than a width of the supporting teeth. The end pieces thus form an axially-slotted cylindrical external contour of the star disk. The end windings herein in the radial direction are disposed between the ring carrier and the end pieces, wherein the end pieces in a rotation of the rotor prevent the end windings slipping from the supporting teeth by virtue of the centrifugal force acting on the end windings. The star disk is preferably at least in part formed from plastics material. The surface of the star disk which herein is in contact with the wires of the windings is in particular formed from the electrically isolating plastics material. For example, a main body of the star disk can be cast or forged from a metal, for example aluminum or steel, which is coated, for example overmolded, with an isolating plastics material.

In order to prevent that stress which by way of the end windings acts on the end pieces destroys the star disk, the support ring can be disposed on the star disk and surround the star disk in the manner of a rim or casing, respectively. The support ring which is disposed so as to be concentric with the star disk thus ensures additional stability and fixing. The support ring is in particular formed, for example cast or forged, from a metallic material. In order to prevent that the support ring is released again from the star disk in the axial direction at high rotating speeds of the rotor, the support ring has to be axially fixed. To this end, the support ring and the star disk have the mutually complementary bayonet closure regions. In particular, the star disk has for each end piece one bayonet closure region such that the bayonet closure regions of the support ring are disposed so as to be distributed in the circumferential direction across the support ring.

The respective bayonet closure regions are in particular configured so as to be integral to the star disk or the support ring, respectively, or are fixedly disposed on the star disk or the support ring, respectively, so as to be non-releasable in a non-destructive manner on the latter. No connection elements which are separate from the support ring and the star disk are thus required for providing the form-fitting connection. The bayonet closure regions thus provide a direct connection between the star disk and the support ring. To this end, the bayonet closure regions are able to be connected to one another by way of the plug-fitting/rotating movement. This means that the star disk and the support ring are initially plug-fitted in an axial manner and are then rotated relative to one another along the circumferential direction. The star disk and the support ring upon carrying out the plug-fitting/rotating movement are connected in a form-fitting manner, on account of which the support ring is axially fixed on the star disk.

A bayonet closure between the support ring and the star disk which is established by way of the plug-fitting/rotating movement is particularly stable and can in particular be provided in a simple manner without any large additional investment material. A rotor which is stable at high rotating speeds can be provided on account of such a support device.

In addition thereto, it proves advantageous for the bayonet closure regions in the plug-fitted state to be conceived for connecting in a force-fitting manner the star disk and the support ring. For example, the bayonet closure regions can be shaped in such a manner that the latter, upon carrying out the plug-fitting/rotating movement, in regions are pressed onto one another by a normal force which acts in the radial direction and are thus connected in a force-fitting manner. The advantage that a stability of the rotor can be further increased results on account of the form-fitting and force-fitting connection between the star disk and the support ring.

It can be provided herein that the bayonet closure regions of the end pieces have in each case at least one longitudinal groove which is disposed on an external side of the respective end piece and at least one transverse groove which is contiguous to the longitudinal groove, and the bayonet closure regions of the support ring have for each end piece at least one latching cam which is disposed on an internal side of the support ring and which in the plug-fitting movement is able to be pushed in the axial direction along the longitudinal groove and in the rotating movement is able to be pushed in the circumferential direction along the transverse groove. In particular, the bayonet closure regions per end piece have in each case three longitudinal grooves which run in parallel and one transverse groove which connects the longitudinal grooves, and the bayonet closure regions of the support ring have for each end piece in each case three latching cams.

The end pieces herein can be configured so as to be integral, wherein the longitudinal grooves and the transverse grooves are configured as structured features on the external sides of the end pieces. The end pieces can however also be configured in multiple parts and have in each case one first part which faces the end windings and one second part which faces the support ring and which forms the bayonet closure region of the respective end piece. The first part can be formed from plastics material, for example, and thus be electrically isolated in relation to the end windings. The second part can be formed from metal and thus configure a particularly stable connection to the metallic support ring. The first part and the second part are connected to one another in a non-destructible non-releasable manner.

The longitudinal groove and the transverse groove that is contiguous to the former form a guide rail in which the latching cam of the support ring can be guided. The latching cams are projections in the internal side of the support ring and may be produced by structuring the internal side of the in particular metallic support ring, for example. The latching cams, which are disposed so as to be distributed in the circumferential direction across the internal side, are introduced into the longitudinal grooves along an axial plug-fitting direction and slid into the transverse grooves along a rotating direction. The transverse grooves prevent that the latching cams disposed therein and thus the entire support ring can move axially counter to the plug-fitting direction.

The bayonet closure regions of the support ring particularly preferably have oblate elevations which are axially contiguous to the latching cams and which configure first mating faces. The bayonet closure regions of the end pieces have oblate regions which in the circumferential direction are contiguous to the longitudinal grooves and which configure second mating faces. The first and the second mating faces upon carrying out the rotating movement are pressed onto one another so as to configure a force-fitting connection. The longitudinal grooves and the elevations can have beveled lateral walls which form friction faces such that the elevations in the rotating movement can slide out of the longitudinal grooves and onto the regions and be pressed onto the latter. The elevations and the regions can have, for example, trapezoidal cross sections. For example, the metallic support ring, prior to fastening to the star disk, can be heated on account of which the metallic support ring expands and the plug-fitting/rotating movement is easier to carry out. As soon as the support ring is located in the state fastened in a form-fitting manner to the star disk the support ring can cool down, on account of which the mating faces are pressed against one another in the radial direction and the force-fitting connection is configured. Centering of the support ring can additionally be achieved in an advantageous manner on account of the mating faces.

It can be provided that at least one of the end pieces has a detent up to which the support ring is able to be rotated. A position of the support ring in relation to the star disk according to the intended use can be indicated and adhered to on account of the detent, the form-fitting connection between the support ring and the star disk being provided by the bayonet closure regions in the position according to the intended use. The detent thus terminates the rotating movement as soon as the star disk and the support ring have assumed the mutual position according to the intended use of the star disk and the support ring. For example, one of the latching cams or one of the elevations of the support ring can impact the detent and terminate the rotating movement.

In one refinement of the invention, the support ring has a cylindrical casing region which surrounds the star disk and which comprises the bayonet closure regions of the support ring, and has an annular cover region which from the casing region projects radially inward and at least in regions overlaps an upper side of the star disk. The cover region covers in particular at least the end windings on the upper side of the star disk. In particular, an internal contour of the annular cover region is configured as a mating face for pressing onto a rotor shaft which is guided axially through the laminated core. The annular cover region can thus protrude beyond the upper side of the star disk up to an internal periphery of the tube carrier and thus be pressed onto the rotor shaft. Moreover, the support ring can be centered on account of the support ring being disposed on the rotor shaft.

The invention moreover relates to a separately excited internal-rotor synchronous machine for a motor vehicle, having a stator which has a laminated core having stator windings, and a rotor according to the invention, the rotor being mounted so as to be able to rotate in a cavity of the laminated core of the stator.

A motor vehicle according to the invention comprises a separately excited internal-rotor synchronous machine according to the invention. The motor vehicle is in particular a passenger motor vehicle in the form of an electric vehicle or a hybrid vehicle, and comprises the separately excited internal-rotor synchronous machine as a traction machine or a drive machine, respectively.

The embodiments and advantages thereof presented with reference to the support device according to the invention apply in an analogous manner to the rotor according to the invention, to the internal-rotor synchronous machine according to the invention, as well as to the motor vehicle according to the invention.

Further features of the invention are derived from the claims, from the figures, and from the description of the figures. The features and combinations of features which are mentioned in the description above and the features and combinations of features which are mentioned in the following text in the description of the figures and/or are shown in the figures alone can be used not only in the respectively specified combination, but also in other combinations or on their own.

The invention will now be explained in more detail by means of a preferred exemplary embodiment as well as with reference to the drawings.

Identical and functionally equivalent elements are provided with the same reference signs in the figures.

DETAILED DESCRIPTION OF THE DRAWINGS

Figure 1:
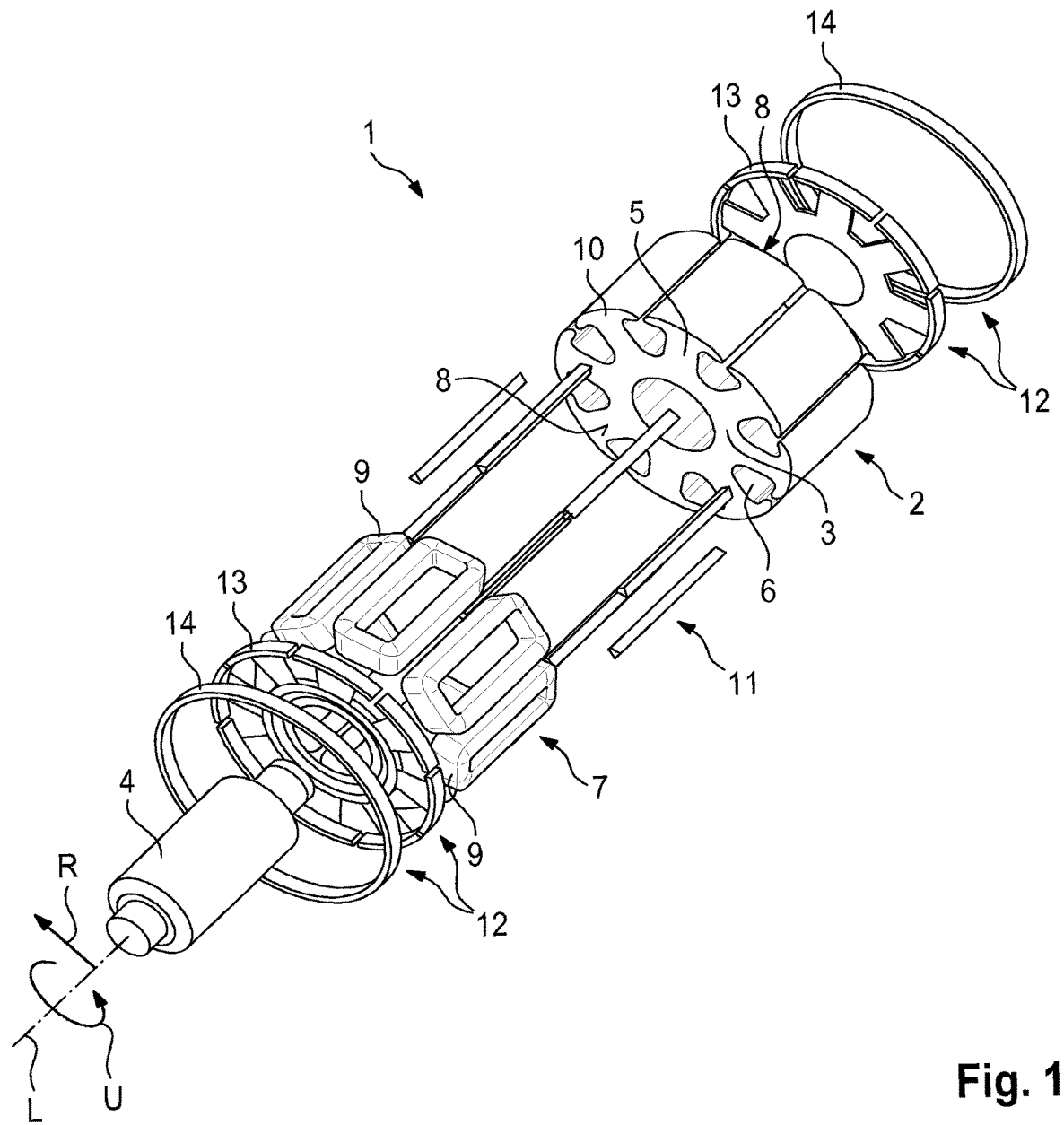
FIG. 1 schematically shows an exploded illustration of a rotor of an internal-rotor synchronous machine.

FIG. 1 shows, in an exploded illustration, a rotor 1 for an internal-rotor synchronous machine (not shown here) of a motor vehicle which is able to be electrically driven. The rotor 1 has a laminated core 2 in the form of an integral iron core. The laminated core 2 has an annular rotor yoke 3 in which a rotor shaft 4, which in the axial direction extends along a longitudinal axis L, or the rotation axis, respectively, of the rotor 1, is able to be disposed. A multiplicity of rotor teeth 5 which in the radial direction R extend outward are disposed along the circumferential direction U on the rotor yoke 3. One rotor groove 6 herein is in each case configured between two adjacent rotor teeth 5. Rotor windings 7 which configure end windings 9 on axially mutually opposite end sides 8 of the laminated core 2 can be wound about the rotor teeth 5. The laminated core 2 moreover has pole shoes 10 which are disposed on ends of the rotor teeth 5 and prevent the end windings 9, which are disposed between the rotor yoke 3 and the pole shoes 10, slipping from the rotor teeth 5 in a rotation of the rotor 1. Moreover, cover slides 11 which close the rotor grooves 6 and prevent the rotor windings 7, by virtue of the minor stiffness thereof, being squeezed out of the rotor grooves 6 are disposed in the rotor grooves 6.

Moreover, the rotor 1 has two support devices 12 according to the prior art, which comprise in each case one star disk 13 according to the prior art and one support ring 14 according to the prior art. The star disk 13 is disposed between the end side 8 of the laminated core 2 and the end windings 9, and ensures inter alia a deflection of the wires of the winding of the rotor windings 7 on the end side 8. The support ring 14 which ensures additional stability and fixing of the star disk 13 is disposed around the star disk 13. In the case of a support device 12 of this type of design it can arise that the support ring 14 is released from the star disk 13 during the rotation of the rotor 1, and an operational reliability of the electric machine can no longer be guaranteed.

Figure 2:
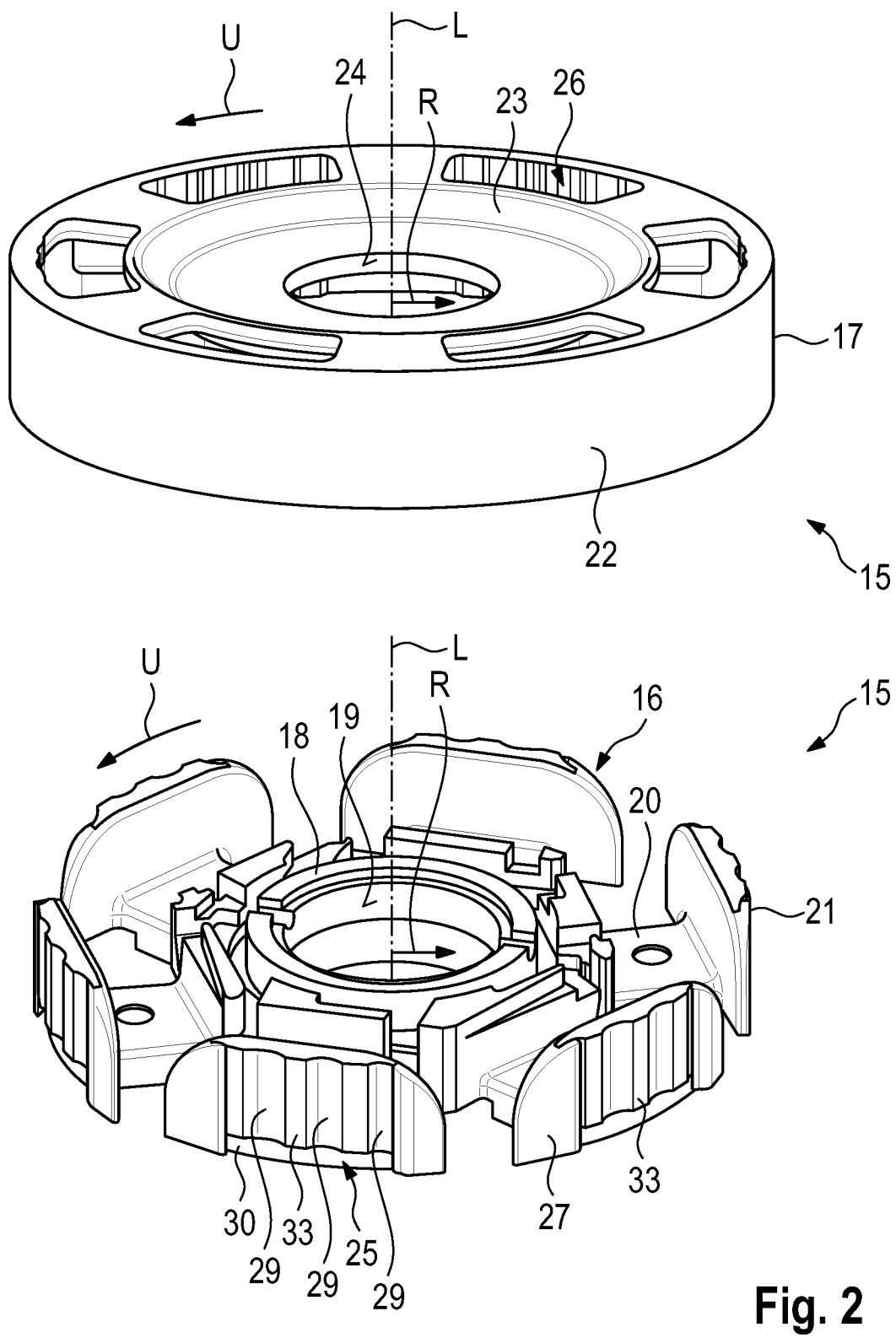
FIG. 2 is a schematic illustration of an embodiment of a support device according to the invention for a rotor, having a star disk and a support ring.
Figure 3:
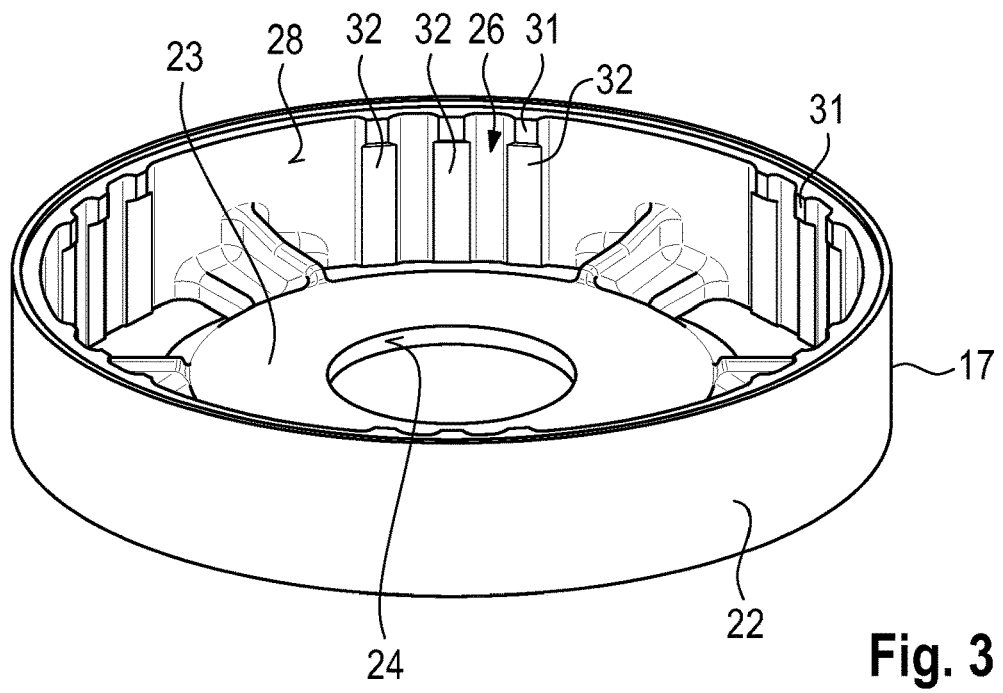
FIG. 3 shows the support ring according to FIG. 2 from another perspective.

Therefore, the support device 12 of the rotor 1 is replaced by a support device 15 according to the invention, as is shown in an exemplary manner in FIG. 2. The support device 15 has a star disk 16 according to the invention as well as a support ring 17 according to the invention. A view of the support ring 17 from another perspective is shown in FIG. 3. The star disk 16 has a ring carrier 18 which can be disposed so as to bear on the rotor yoke 3 of the laminated core 2 of the rotor 1 (without the support device 12). The rotor shaft 4 herein can be guided through the ring carrier 18. An internal side 19 of the ring carrier 18 can configure a mating face by way of which the star disk 16 and the rotor shaft 4 can be connected by means of an interference fit. An additional tension ring (not shown here) may also be disposed between the rotor shaft 4 and the internal side 19 of the ring carrier 18. In this case, there is a clearance fit between the star disk 18 and the rotor shaft 4 and an interference fit between the tension ring and the rotor shaft 4 in the state of the star disk 16 disposed on the end side 8 of the laminated core 2.

Supporting teeth 20 which can be disposed on the end side 8 of the laminated core 2 so as to overlap the rotor teeth 5 project radially from the ring carrier 18. The rotor windings 7 from one rotor groove 6 to an adjacent rotor groove 6 are guided by way of the supporting teeth 20 such that the supporting teeth 20 in the axial direction are disposed between the rotor teeth 5 and the end windings 9. The star disk 16 moreover has collar-type end pieces 21 which project axially and which can absorb the centrifugal forces acting on the end windings 9. The end pieces 21 here are configured as partially curved plate-type elements. The support ring 17 is formed from metal and has an annular casing region 22 as well as an annular cover region 23 which protrudes radially inward. An internal contour 24 of the cover region 23 configures a mating face which, for connecting the support ring 17 to the rotor shaft 4, can be pressed onto the rotor shaft 4.

The star disk 16 and the support ring 17 can be connected in form-fitting manner by way of a plug-fitting/rotating movement. To this end, the star disk 16 and the support ring 17 have mutually complementary bayonet closure regions 25, 26. The bayonet closure regions 25 of the star disk 16 are located on an external side 27 of the end pieces 20, and the bayonet closure regions 25 of the support ring 17 are located in the casing region 22 on an internal side 28 of the support ring 17. The external side 27 and the internal side 28 in the assembled state of the support device 15 are disposed so as to be mutually radially contiguous.

The star disk 16 in regions here is formed from plastics material, wherein the bayonet closure regions 25 of the end pieces 21 are formed from metal. However, it may also be the case that the entire star disk 16, also in the bayonet closure regions 25, is formed from plastics material. The bayonet closure region 25 of an end piece 21 here has three axially extending longitudinal grooves 29 which run in parallel, as well as a transverse groove 30 which is contiguous to the longitudinal grooves 29 and extends in the circumferential direction U. The bayonet closure regions 26 of the support ring 17 here have for each end piece 21 three latching cams 31 (cf. FIG. 3) which project radially inward from the internal side 28 of the casing region 22. The support ring 17 in the axial direction, so as to be contiguous to the latching cams 31, has oblate elevations 32 which configure first mating faces. The support ring 16 has oblate regions 33 which in the circumferential direction U are contiguous to the longitudinal grooves 29 and likewise configure mating faces.

Figure 4:
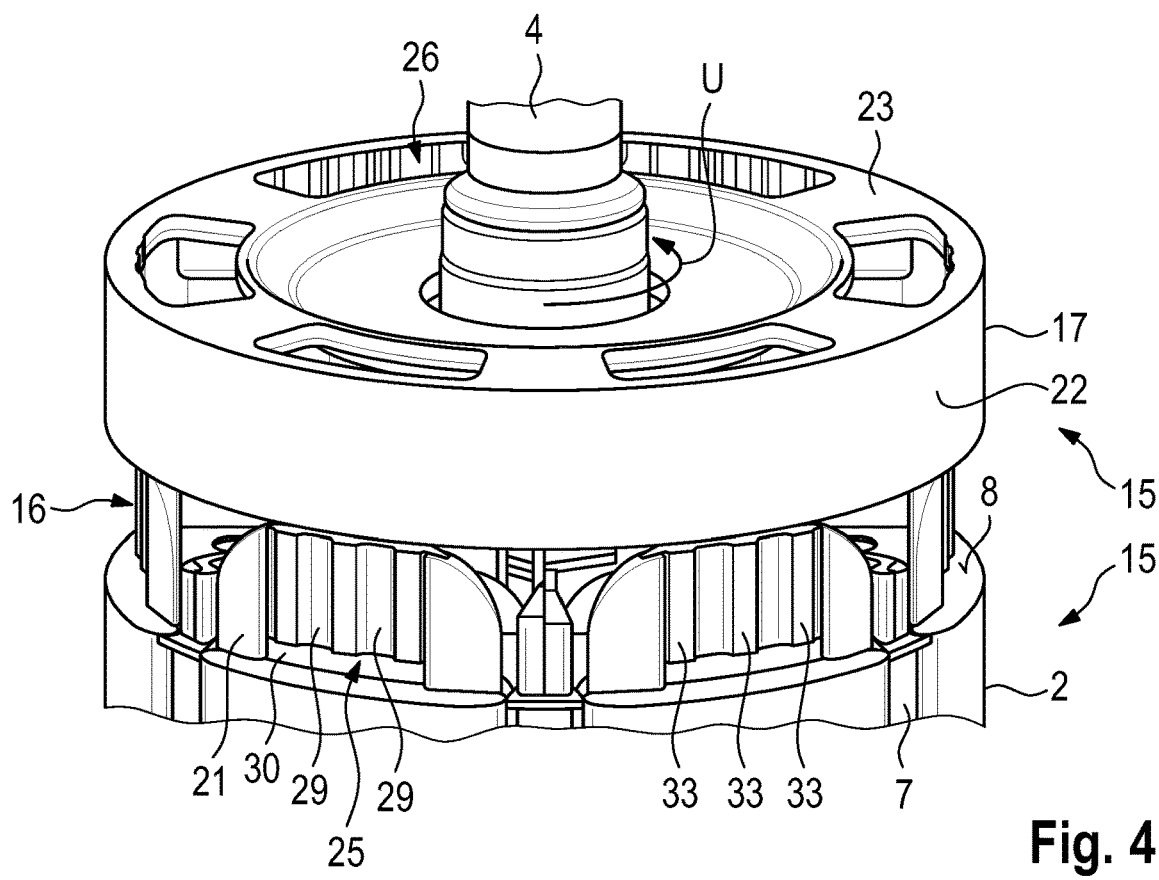
FIG. 4 shows a first assembling step for assembling the support device on a laminated core of the rotor.
Figure 5:
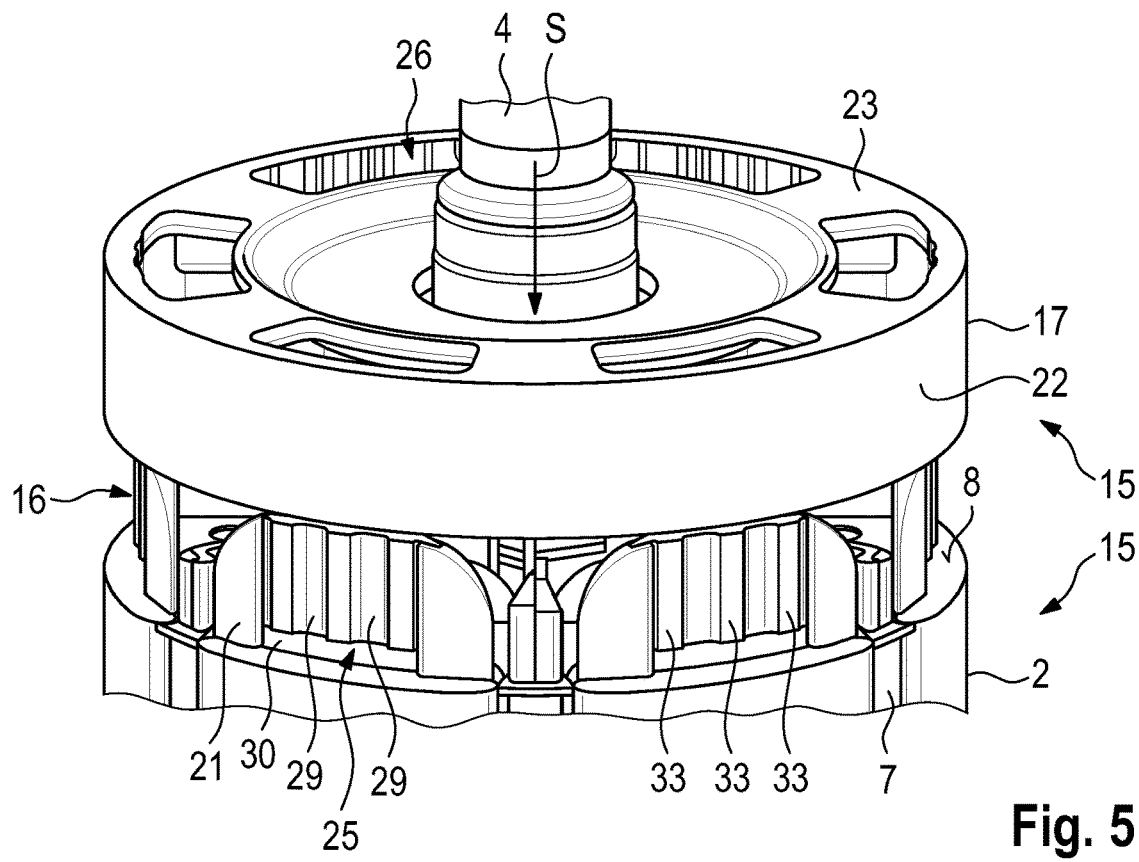
FIG. 5 shows a second assembling step for assembling the support device on the laminated core of the rotor.
Figure 6:
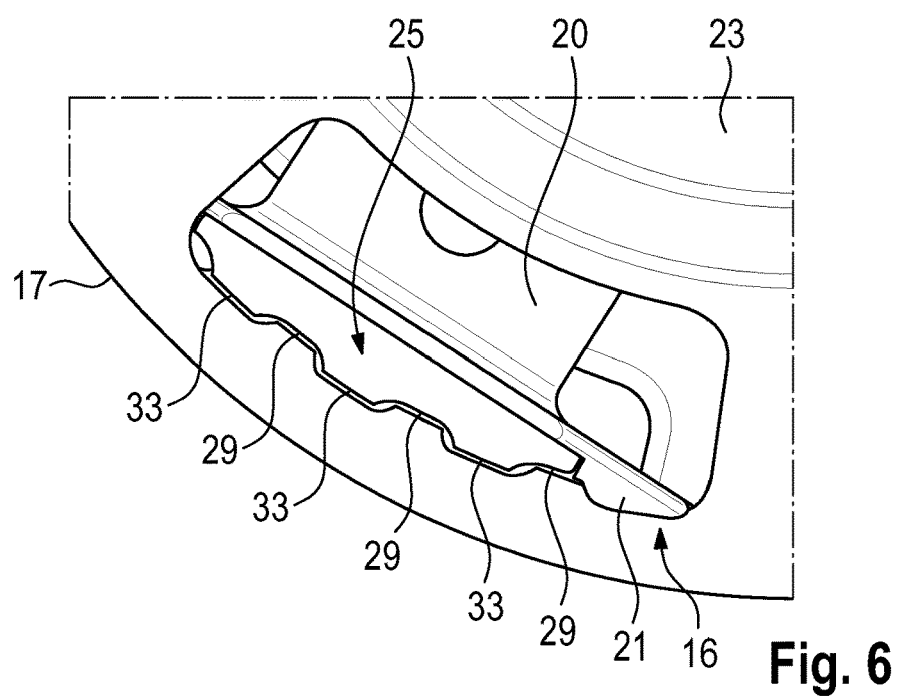
FIG. 6 shows a cross section through the support device during the assembling step according to FIG. 5.
Figure 7:
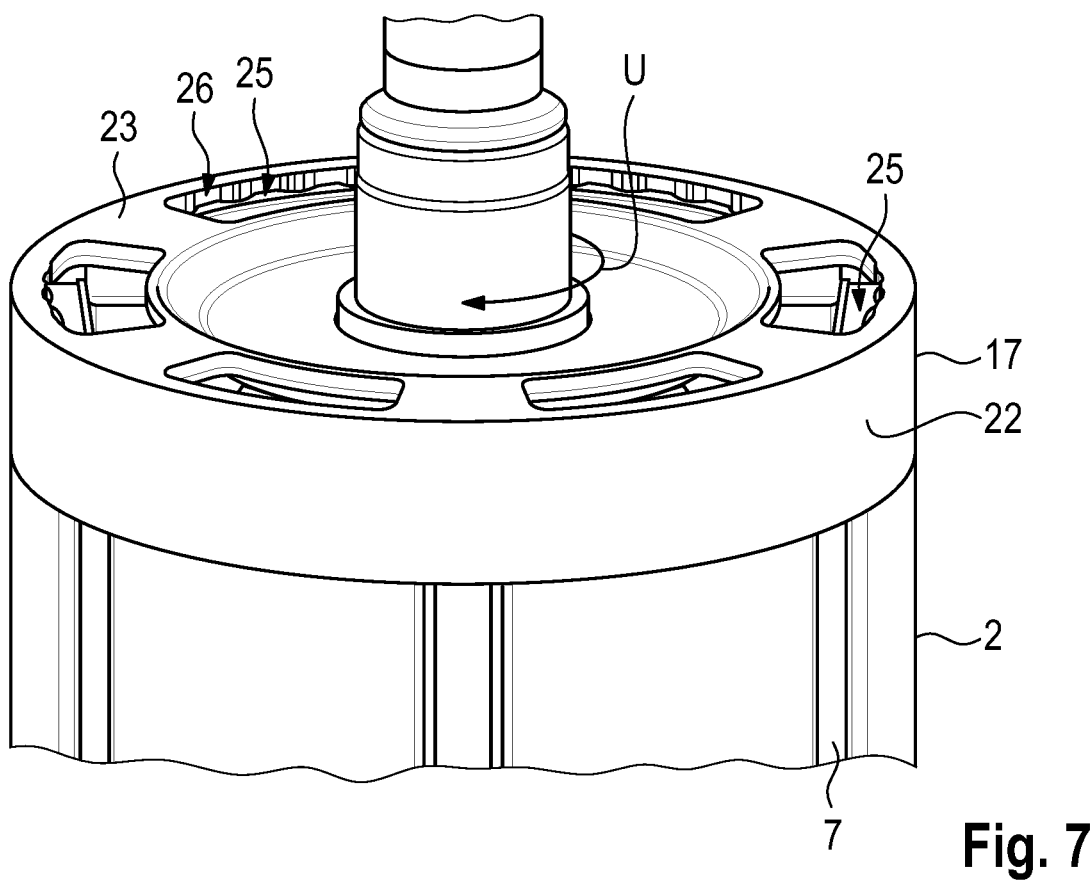
FIG. 7 shows a third assembling step for assembling the support device on the laminated core of the rotor.

FIG. 4 shows a first assembling step for assembling the support ring 17 on the star disk 16 which is already disposed between the end side 8 and the end windings 9 of the rotor 1. First, the support ring 17 is rotated along the circumferential direction U until the latching cams 31 are disposed so as to be in alignment with, or in line with, respectively, the longitudinal grooves 29 of the end pieces 21 of the star disk 16. In a second assembling step, illustrated in FIG. 5, the support ring 17 in an axial plug-fitting direction S is pushed in the direction of the end side 8. The latching cams 31 herein slide along in the longitudinal grooves 19. FIG. 6 shows a cross section through the support device 15 in the region of the bayonet closure regions 25, 26. The support ring 17 here is completely pushed onto the star disk 16 up to the end side 8. In this state, the latching cams 31 have completely passed through the longitudinal grooves 29. In a third assembling step, such as is shown in FIG. 7, the support ring 17 is rotated in the circumferential direction U, wherein the latching cams 31 are displaced into the transverse groove 30 during the rotating movement.

Figure 8:
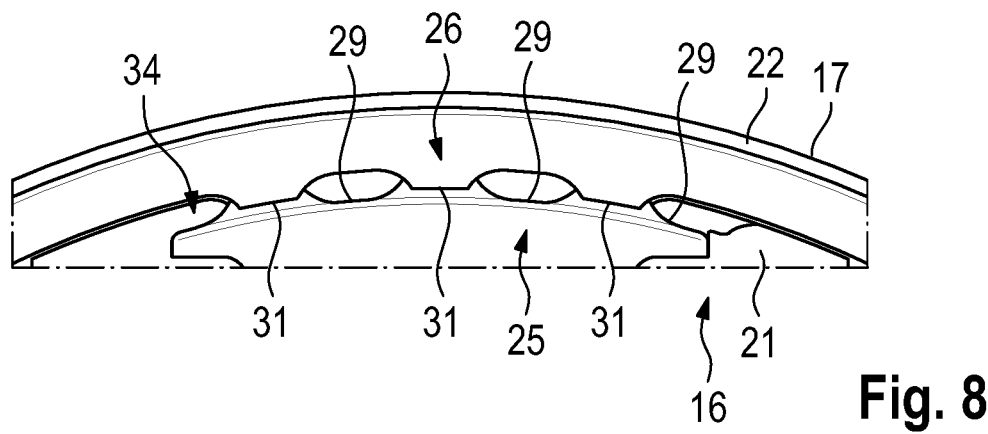
FIG. 8 is a cross section through the support device after the assembling according to FIG. 7.

In order for the rotating movement to be terminated, the end piece, as is shown in the cross section in FIG. 8, has a detent 34 on which the latching cam 31 impacts. As soon as the latching cam 31 has impacted the detent 34, the star disk 16 and the support ring 17, by virtue of the bayonet closure formed by the bayonet closure regions 25, 26, are connected in a form-fitting manner. By virtue of the latching cams 31 disposed in the transverse grooves 30, the support ring 17 can thus no longer be removed from the star disk 16 counter to the plug-fitting direction S. Additionally, the oblate elevations 32 of the support ring 17 and the oblate regions 33 of the star disk 16 in this state are pressed against one another along the radial direction R and additionally connect the support ring 17 and the star disk 16 also in a force-fitting manner.

LIST OF REFERENCE SIGNS

1 Rotor
2 Laminated core
3 Rotor yoke
4 Rotor shaft
5 Rotor tooth
6 Rotor groove
7 Rotor winding
8 End side
9 End winding
10 Pole shoes
11 Sliding cover
12 Support device
13 Star disk
14 Support ring
15 Support device
16 Star disk
17 Support ring
18 Ring carrier
19 Internal side of the ring support
20 Supporting tooth
21 End piece
22 Casing region
23 Cover region
24 Internal contour
25 Bayonet closure regions of the star disk
26 Bayonet closure regions of the support ring
27 External side of the end pieces
28 Internal side of the support ring
29 Longitudinal groove 30 Transverse groove
31 Latching cam
32 Elevations
33 Regions
34 Detent
L Longitudinal axis
r Radial direction
U Circumferential direction
S Plug-fitting direction

What is claimed is:

1. A support device for a rotor of a separately excited internal-rotor synchronous machine of a motor vehicle which is able to be electrically driven, comprising:
   a star disk which is able to be disposed on a laminated core of the rotor, between an end side of the laminated core and end windings of rotor windings of the rotor which project on the end side;
   a support ring for encasing the star disk, wherein the star disk comprises:
   a ring carrier for disposal on a rotor yoke of the laminated core;
   supporting teeth which, for disposal on rotor teeth, project radially from the ring carrier, the rotor teeth projecting radially from the rotor yoke and supporting the rotor windings; and
   collar-type end pieces which, for disposal on pole shoes that project from the rotor teeth and for absorbing centrifugal forces of the end windings, project axially from ends of the supporting teeth; and wherein
   the end pieces and the support ring have mutually complementary bayonet closure regions which are able to be locked to one another by a plug-fitting/rotating movement and which are configured for connecting in a form-fitting manner the star disk and the support ring.

2. The support device according to claim 1, wherein the bayonet closure regions in the plug-fitted state are additionally configured for connecting in a force-fitting manner the star disk and the support ring.

3. The support device according to claim 1, wherein the bayonet closure regions of the end pieces have in each case at least one longitudinal groove which is disposed on an external side of the respective end piece and at least one transverse groove which is contiguous to the longitudinal groove, and
   the bayonet closure regions of the support ring have for each end piece at least one latching cam which is disposed on an internal side of the support ring and which in the plug-fitting movement is able to be pushed in the axial direction along the longitudinal groove and in the rotating movement is able to be pushed in the circumferential direction along the transverse groove.

4. The support device according to claim 3, wherein the bayonet closure regions of the end pieces have in each case three longitudinal grooves which run in parallel and one transverse groove which connects the longitudinal grooves, and
   the bayonet closure regions of the support ring have for each end piece three latching cams.

5. The support device according to claim 3, wherein the bayonet closure regions of the support ring have oblate elevations which are axially contiguous to the latching cams and which configure first mating faces, and
   the bayonet closure regions of the end pieces have oblate regions which in the circumferential direction are contiguous to the longitudinal grooves and which configure second mating faces, wherein
   the first and the second mating faces upon carrying out the rotating movement are pressed onto one another so as to configure a force-fitting connection between the support ring and the star disk.

6. The support device according to claim 1, wherein at least one of the end pieces has a detent up to which the support ring is able to be rotated.

7. The support device according to claim 1, wherein the support ring has a cylindrical casing region which extends axially and surrounds the star disk and comprises the bayonet closure regions, and has an annular cover region which from the casing region projects radially inward and at least in regions overlaps an upper side of the star disk that faces away from the end side of the laminated core.

8. The support device according to claim 7, wherein an internal contour of the annular cover region is configured as a mating face for pressing onto a rotor shaft which is guided axially through the laminated core.

9. The support device according to claim 1, wherein the support ring is configured from a metallic material.

10. The support device according to claim 1, wherein the star disk is at least in part formed from plastics material.

11. The support device according to claim 10, wherein the bayonet closure regions of the star disk are formed from a metallic material.

12. A rotor for a separately excited internal-rotor synchronous machine of a motor vehicle which is able to be electrically driven, comprising:
    a laminated core having an annular rotor yoke, rotor teeth which project radially from the rotor yoke, and pole shoes which project on the rotor teeth;
    rotor windings which are wound about the rotor teeth and on axially opposite end sides of the laminated core configure end windings;
    at least one support device according to claim 1, wherein the star disk is disposed between an end side and the end windings and the support ring radially surrounds the star disk and is connected in a form-fitting manner to the star disk.

13. A separately excited internal-rotor synchronous machine for a motor vehicle, comprising:
    a stator which has a laminated core having stator windings; and
    a rotor according to claim 12, which rotor is mounted so as to be able to rotate in a cavity of the laminated core of the stator.

14. A motor vehicle comprising a separately excited internal-rotor synchronous machine according to claim 13.

* * * * *